United States Patent [19]

Voth

[11] Patent Number: 5,112,208
[45] Date of Patent: May 12, 1992

[54] PIZZA DOUGH ROLLER MACHINE

[76] Inventor: Dean Voth, P.O. Box 191, Lampe, Mo. 65681

[21] Appl. No.: 700,091

[22] Filed: May 6, 1991

Related U.S. Application Data

[62] Division of Ser. No. 538,761, Jun. 15, 1990, abandoned.

[51] Int. Cl.⁵ .......................................... B29C 53/16
[52] U.S. Cl. ................................. 425/367; 264/175; 425/363
[58] Field of Search ............. 264/175; 425/288, 362, 425/363, 366, 367, 368, 369, 373, 374, 365

[56] References Cited

U.S. PATENT DOCUMENTS

| | | | |
|---|---|---|---|
| 1,252,822 | 1/1918 | Lorioli | 425/294 |
| 2,829,606 | 4/1958 | Dielentheis | 425/373 |
| 2,898,873 | 8/1959 | Cale | 425/367 |
| 3,023,714 | 3/1962 | Seewer | 425/363 |
| 3,272,153 | 9/1966 | Morabito | 425/373 |
| 4,375,349 | 3/1983 | Vrbanek | 425/366 |
| 4,381,906 | 5/1983 | Mancini | 425/106 |
| 4,586,888 | 5/1986 | Anderson | 425/362 |
| 4,770,619 | 9/1988 | Rijkaart | 425/367 |

OTHER PUBLICATIONS

Dictionary of Mechanical Engineering, 3rd Edition, G. H. F. Nayler, Butterworths, London, England, 1985, pp. 282-283.

Marks' Standard Handbook for Mechanical Engineers, Ninth Edition, Eugene A. Avallone and Theodore Baumeister III (Editors), McGraw-Hill Book Company, New York, N.Y., 1989, pp. 8-131 to 8-137.

Primary Examiner—Richard L. Chiesa
Assistant Examiner—William J. Matney, Jr.
Attorney, Agent, or Firm—Head & Johnson

[57] ABSTRACT

A pizza dough roller machine having the drive mechanism mounted on the exterior of the machine housing to prevent contamination of the dough with the drive mechanism. The dough rollers are mounted by means of easily accessible and maintained bearings, which bearings are adjustable for wear and are adapted to be moved spatially to position the rollers at desired locations to control the thickness of the dough.

10 Claims, 3 Drawing Sheets

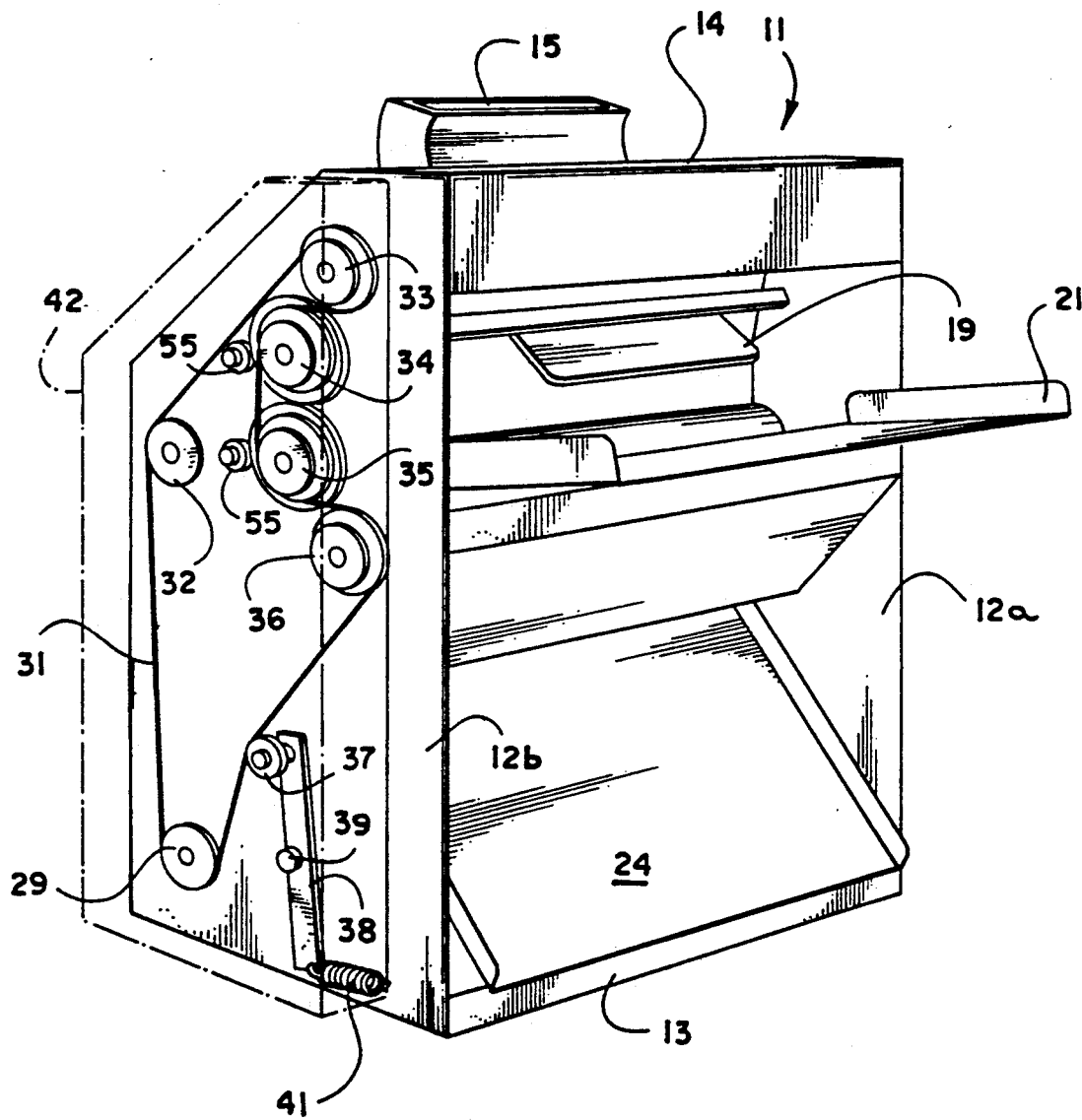
Fig_1

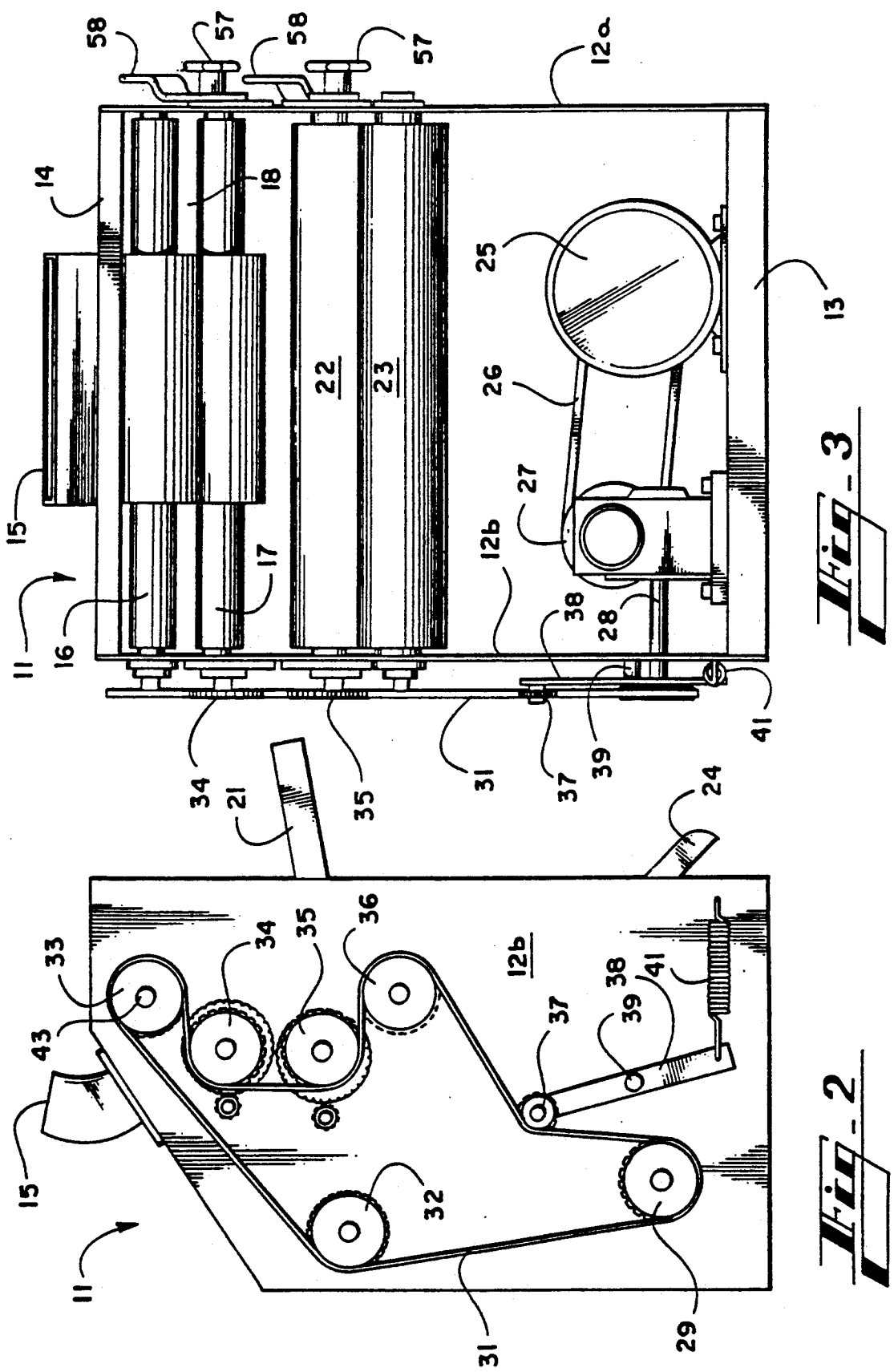

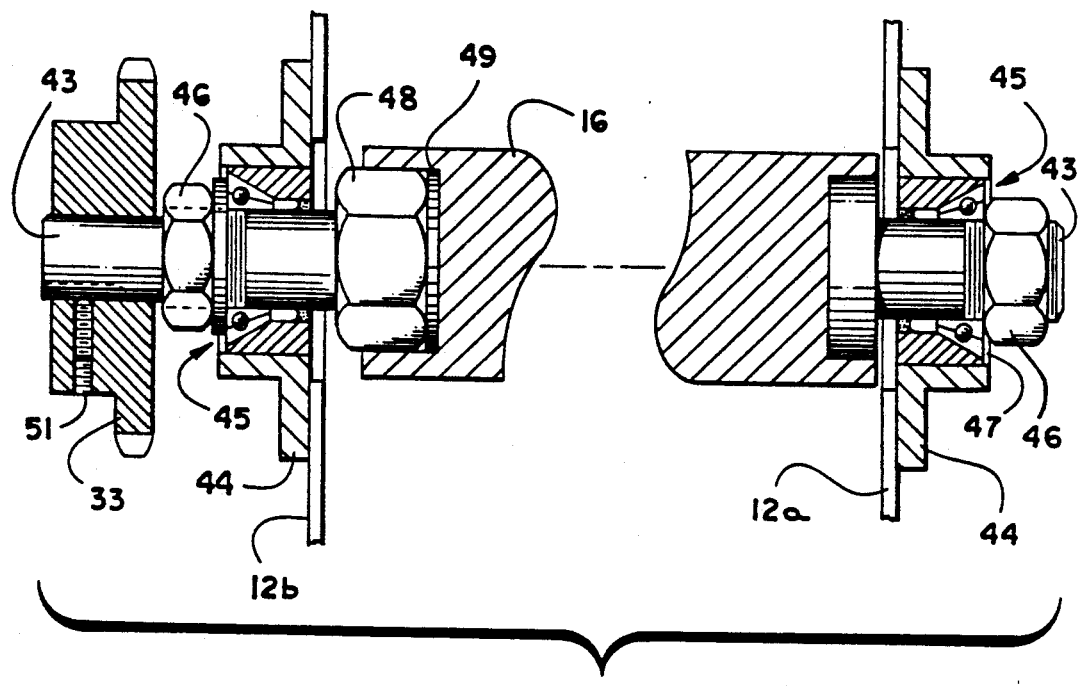
*Fig_4*
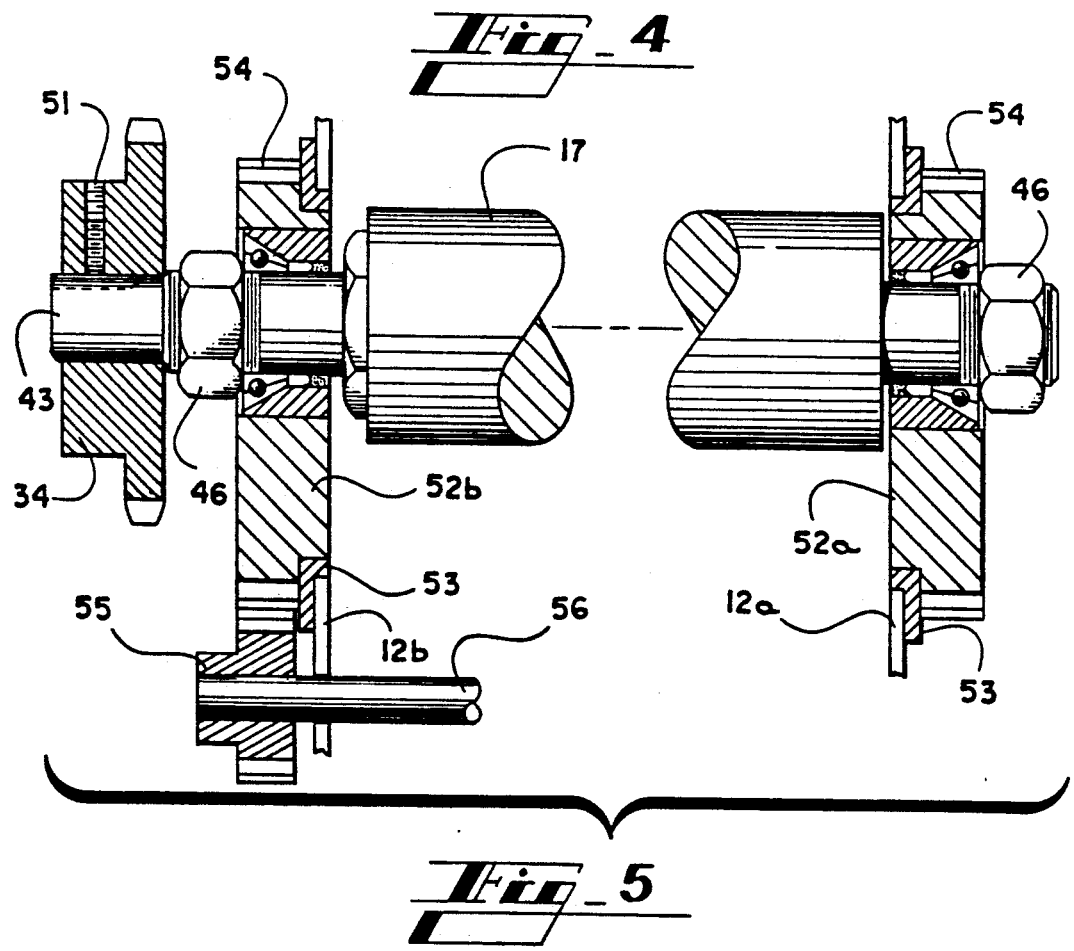
*Fig_5*

PIZZA DOUGH ROLLER MACHINE

This is a continuation of copending U.S. patent application Ser. No. 07/538,761, filed on Jun. 15, 1990, now abandoned.

BACKGROUND OF THE INVENTION

1. Field of the Invention

The present invention relates generally to the field of machines for food processing, and more particularly to a machine which processes dough into a finished product for use in the pizza baking process.

2. Description of the Prior Art

Relatively small bench mounted pizza dough rolling machines are quite common in the art and are used in virtually every pizza making operation. The machines of the prior art are generally small machines and are adapted to be mounted upon a bench where the operator has full control over the machine and the adjusting parts thereof. There are several well-known dough rolling machines on the market today, however, they all suffer from one or more problems which make the machines less than satisfactory.

Typically the devices of the prior art are so constructed that they have stationary roller shafts which are equipped with ultra light ball bearings, and thus the rollers operate as idlers on the stationary shafts and have sprockets welded on one end of the roller for a chain drive. More importantly, the chain and complete drive mechanism is generally located interiorly of the roller machine housing which causes several problems. The least of which is that the dough frequently comes into contact with the moving parts of the machine, thereby creating an extremely unsanitary condition.

During operation of the standard dough rolling machines, the dough is often squeezed into the chain area next to the side walls of the housing, thereby impregnating the bearings, sprockets and chain drive of the machine. Daily cleaning is almost impossible as there is no convenient way to clean the sidewall housing without removing the entire housing and, consequently, the drive mechanism of the machine. Proper lubricants are restricted due to the likelihood of contact between the food stuffs and the drive mechanism and, therefore, the lack of lubrication causes the moving parts of the dough roller to become frictionally unstable. This causes excessive wear to the chain, bearings and sprockets that are mounted in the drive mechanism.

The excessive wear of the drive mechanism causes the machine to experience considerable down time resulting in economic loss to the pizza maker. It is required that the moving parts, such as the sprockets, rollers, shafts and bearings, be removed from the machine in order to repair the machine. Normally, this requires the services of a qualified machinist to totally rebuild the machine and to replace the worn parts with new parts. This results in a lengthy down time which is quite expensive for the pizza operator

SUMMARY OF THE INVENTION

It is, therefore, an object of the invention to provide a pizza dough roller with a drive mechanism that is located exteriorly of the dough roller housing rather than having a factory installed interior drive.

It is yet another object of the invention to provide a drive mechanism for a pizza dough rolling machine that is sanitary and will greatly reduce maintenance and upkeep costs of the machine.

Other objects, advantages and capabilities of the invention will become apparent from the following description taken in conjunction with the accompanying drawings showing only a preferred embodiment of the invention.

BRIEF DESCRIPTION OF THE DRAWINGS

FIG. 1 is a perspective view of the proposed dough rolling machine showing especially the exteriorly mounted drive mechanism;

FIG. 2 is a side elevation view of the dough rolling machine showing especially the drive mechanism;

FIG. 3 is a front elevation view showing the machine having its front cover removed to allow ease of visibility;

FIG. 4 is a partial section view of one of the live shaft rollers of the machine; an FIG. 5 is a partial section view of one of the eccentric shaft rollers.

DESCRIPTION OF THE PREFERRED EMBODIMENT

Referring to the drawings wherein like numerals designate corresponding parts throughout the several figures, the dough rolling machine of the present invention is generally indicated by the numeral 11. A pair of side housing walls 12a and 12b provide the basic support for the drive mechanisms of the present invention, and are interconnected by a bottom plate 13 and an upper plate 14. Mounted in conjunction with the upper plate 14 is a dough hopper 15 which is adapted to feed the kneaded dough to the internal workings of the machine 11. As the dough moves through the hopper 15, it is fed between upper top roller 16 and upper bottom roller 17. The rollers are adjusted so that the space 18 therebetween reduces the thickness of the dough to a preset amount. The dough is then fed from rollers 16 and 17, and exits upon upper slide 19 where it is caught by the machine operator.

The machine operator then feeds the dough onto feed tray 21, which positions the dough so that it is reduced in thickness by passing between lower top roller 22 and lower bottom roller 23 and, subsequently, the dough exits upon lower slide 24 where it is retrieved by the machine operator. The dough is then placed upon the pizza baking pan in the normal manner.

The various rollers and idlers are turned by operation of the electric drive motor 25 acting through drive belt 26 which in turn drives a conventional transmission 27, which has a drive output shaft 28 connected between the transmission and the driving mechanism to be described. The driving mechanism, as may fully be seen in FIGS. 1, 2 and 3, is placed exteriorly with respect to the machine 11 and cannot come into contact with the dough as it is being processed within the machine. The output of the drive shaft 28 is transmitted to sprocket 29 which is affixed to the drive output shaft, which in turn drives a conventional chain 31. It should be noted that the chain may well be a drive belt if such should prove more practical. The chain is supported by idler sprocket 32 and then drives the upper top roller sprocket 33 and weaves around to engage upper bottom roller sprocket 34, lower top roller sprocket 35, lower bottom roller sprocket 36, engages the lower idler tension sprocket 37 and, subsequently, completes a circle upon itself at drive sprocket 29. To maintain the chain 31 properly tensioned around the various sprockets, the lower idler tension sprocket 37 takes up any slack in the chain inasmuch as it is tensioned against the chain by the idler lever 38, which lever is pivotedly mounted about pivot 39 and has a tensioning lower idler lever spring 41 at its distal end. Once the entire drive mechanism is assembled and the machine is ready for operation, the machine would normally have a cover to enclose the entire drive mechanism for both safety and aesthetic reasons. A cover for the machine is shown in phantom lines in FIG. 1 and is indicated by numeral 42.

An especially important feature of the present invention is the method and manner of mounting the dough rollers and the adjustment mechanisms for positioning the rollers with respect to one another. Generally the rollers are a live shaft system in which the shaft is secured to the roller by means of a bolt, washer and jam nut method, and the bearings associated with the shafts are tapered cone and roller bearings which are adjustable for wear and can be repacked with grease thereby making the bearing many times stronger than the original equipment and allowing the operator to do on-site adjustments for maintaining the shafts in proper operating condition. In addition, the bearings of the present invention can be serviced with ease and replaced at the customer's site, thereby saving considerable time and expense.

As previously alluded to, each pair of rollers are adjustable with respect to one another in order to roll out the dough to the desired thickness. However, to adjust the rollers with respect to one another, it was found that an eccentric adjustment mechanism was by far the most practical in that it offered ease of manufacture and ease of operation by relatively untrained operators. Therefore, in order to have an adjustment mechanism with each of the sets of rollers, it should be noted that the upper roller set, rollers 16 and 17, require that roller 16 be maintained stationary with respect to the side housing walls and that roller 17 be mounted on an eccentric mechanism whereby the roller can be adjusted with respect to roller 16 to define the space 18 to a high degree of accuracy. The same adjusting mechanism is true for the lower rollers 22 and 23.

Turning now to FIG. 4 which shows a stationary live shaft roller and its associated bearings and sprockets, the shaft 43 extends across the entire width of the machine 11 and projects past the side housing walls 12a and 12b as noted. At the point where the shaft projects through side housing wall 12a, the shaft terminates in a bearing which includes a bearing housing 44 that encloses the tapered roller bearing 45 which firmly engages the shaft 43. The entire bearing unit is maintained about the shaft by means of a retaining nut 46 threaded upon the shaft and bearing against washer 47, which exerts sufficient pressure upon the bearing unit to maintain all parts in operative relationship with one another. The same type of bearing unit is found on each end of the shaft 43, however, the roller is maintained on the shaft near its termination at side housing 12b by means of an additional nut and washer 48 and 49 respectively.

Where shaft 43 exits side housing 12b, the end of the shaft is somewhat longer than the end of the shaft which exits side housing 12a for the purpose of mounting a drive sprocket 33 thereupon. As can be seen, the drive sprocket 33 is maintained on shaft 43 by means of a set screw 51 engaging a keyway within the shaft. While the description just rendered for shaft 43 and its associated parts has been shown to be the entire upper top roller 16, it should be noted that lower bottom roller 23 is essentially the same and comprises the same parts as just described.

Inasmuch as it is critical to provide a means to adjust relative distance between the sets of rollers 16 and 17, and 22 and 23 respectively, a provision must be made for adjusting the pairs of rollers with respect to one another so as to cause the dough to be discharged at a desired thickness. To accomplish this, rollers 17 and 22 are mounted in the machine on eccentrics so that these rollers may be adjustable as desired.

It will be noted in FIGS. 3 and 5 that the rollers are adjustable in the same manner with the only difference being the size of the rollers themselves. Each of rollers 17 and 22 are generally mounted in the same manner as described for the stationary mounted rollers 16 and 23, as more specifically shown in FIG. 4. However, the bearings 45 are mounted within an eccentric housing 52 which is set into a bushing 53 mounted in permanent relationship of the side housing 12a and 12b. Each of the eccentrics 52 have gear teeth 54 cut into the outside peripheral surface of the eccentric in order that the eccentric may be rotated by means of the adjusting sprocket 55 attached to the adjustment shaft 56. Therefore, as seen in FIG. 5, once the adjusting shaft 56 is rotated, the adjusting sprocket 55 rotates the eccentric 52 within the bushing 53. Inasmuch as the roller is mounted off-center within the eccentric, the rotation of the eccentric will position the roller in a different spatial relationship with respect with the stationary roller. The turning of eccentric 52b causes eccentric 52a to follow the same movement, thereby positioning the roller evenly across the length thereof with respect to the stationary roller. In order to effect the movement of eccentrics 52a and 52b, the adjusting shaft 56 is provided with a rotatable knob 57 which is fixed to one end of the shaft 56. Once the adjustable rollers are adjusted to the desired relationship with the stationary rollers, the operator would lock the rollers in position by manipulating handles 58 which provide a frictional lock to the rollers and eccentrics thereby maintaining them in the desired relationship. It should be noted that the mechanisms shown in FIGS. 4 and 5 have been described for respective rollers 16 and 17. However, the mechanism for the other pair of rollers 22 and 23 are identical and any description just made will equally apply to the lower set of rollers.

Various modifications may be made of the invention without departing from the scope thereof and it is desired, therefore, that only such limitations shall be placed thereon as are imposed by the prior art and which are set forth in the appended claims.

I claim:

1. For use in a dough rolling machine having a rotating roller mounted on a fixed axis between a pair of walls and a rotating roller on a movable axis parallel thereto, an improved eccentric mechanism for adjusting the space between the rollers comprising:

a pair of eccentric housings, one in each of said walls, rotatably mounted about a housing fixed axis parallel to said fixed roller axis, said movable roller being eccentrically mounted between said housing on an axis parallel to said fixed axes, said housing having gear teeth about circumferential surfaces thereof exterior to said walls;

a shaft journalled through said walls for rotation about a shaft fixed axis parallel to said roller and housing fixed axes;

a pair of sprockets mounted on said shaft, one exteriorly of each of said walls, each of said sprockets having gear teeth rotatably engaged with said gear teeth of its respective housing; and means for rotating said shaft about said shaft fixed axis whereby said sprockets and said housings are simultaneously rotated to alter the spacing between said fixed and movable rollers while maintaining said fixed roller axis and said variable roller axis in parallel relationship.

2. A mechanism according to claim 1 further comprising means for fixing and releasing one of said sprockets in relation to said shaft whereby said movable roller axis may be properly aligned with said fixed roller axis.

3. A mechanism according to claim 2, said fixing and releasing means comprising a set screw disposed through said sprocket for engagement with said shaft.

4. A mechanism according to claim 1, said means for rotating said shaft comprising a knob fixed to said shaft exterior to one of said walls.

5. A mechanism according to claim 4 further comprising means rotatably mounted on said shaft for frictionally locking said shaft against rotation.

6. A dough rolling machine comprising:
first and second opposed side walls;
a first pair of bearings, one mounted on each of said side walls along a first fixed axis transverse thereto;
a first roller having a shaft mounted on said first pair of bearings;
a pair of eccentric housings, one in each of said walls, rotatably mounted about a second fixed axis parallel to said first fixed axis, said housings having gear teeth about circumferential surfaces thereof exterior to said walls;

a second pair of bearings, one mounted on each of said housings along a movable axis eccentric and parallel to said first and second axes;

a second roller having a shaft mounted on said second pair of bearings;

a third pair of bearings, one mounted in each of said side walls along a third fixed axis parallel to said first fixed axis;

a shaft journalled for rotation in said third pair of bearings;

a pair of sprockets mounted on said shaft, one exteriorly of each of said walls, each of said sprockets having gear teeth rotatably engaged with said gear teeth of its respective housing; and means for rotating said shaft whereby said sprockets and said housing are simultaneously rotated to alter the spacing between said fixed and movable rollers while maintaining said first fixed and said movable axes in parallel relationship.

7. A mechanism according to claim 6 further comprising means for fixing and releasing one of said sprockets in relation to said shaft whereby said movable axes may be properly aligned with said first fixed axis.

8. A mechanism according to claim 7, said fixing and releasing means comprising a set screw disposed through said sprocket for engagement with said shaft.

9. A mechanism according to claim 6, said means for rotating said shaft comprising a knob fixed to said shaft exterior to one of said walls.

10. A mechanism according to claim 9 further comprising means rotatably mounted on said shaft for frictionally locking said shaft against rotation.

* * * * *